United States Patent [19]

Robert

[11] 4,129,480

[45] Dec. 12, 1978

[54] METHOD AND APPARATUS FOR DETERMINING THE IMMERSED SURFACE AREA OF ONE OF THE ELECTRODES OF AN ELECTRO-CHEMICAL BATH

[76] Inventor: Eric Robert, Rue du Chapeau Râblé 19, 2300 - La Chaux-de-Fonds, Canton of Neuchâtel, Switzerland

[21] Appl. No.: 862,399

[22] Filed: Dec. 20, 1977

[30] Foreign Application Priority Data

Dec. 24, 1976 [CH] Switzerland .................. 16297/76

[51] Int. Cl.² ..................... G01N 27/26; C25D 21/12
[52] U.S. Cl. ............................... 204/1 T; 204/195 R; 204/228; 204/231; 324/29; 324/71 R
[58] Field of Search ............ 204/1 T, 231, 228, 195 R; 324/29, 71 R

[56] References Cited

FOREIGN PATENT DOCUMENTS

| | | | |
|---|---|---|---|
| 1964354 | 7/1971 | Fed. Rep. of Germany | 204/1 T |
| 2303717 | 8/1974 | Fed. Rep. of Germany | 204/1 T |

*Primary Examiner*—G. L. Kaplan
*Attorney, Agent, or Firm*—Silverman, Cass & Singer, Ltd.

[57] ABSTRACT

The immersed surface area of one of the electrodes in a conventional electro-chemical bath is accurately determined, so that the bath may be operated at an optimium current density, to obtain high quality electro-plating or electro-polishing. The current density is measured as a certain amount of current over the immersed area of the electrode. For any given area, the current density may be varied by varying the current flow.

The potential between the bath and the electrode of interest is measured when no current is being conducted through the bath. A short pulse of current is then passed through the bath from one electrode to the other; and immediately thereafter the potential between the bath and the electrode of interest is again measured. These two potentials are then compared, and the potential difference is used to determine the immersed surface area of the electrode of interest according to a mathematical relationship corresponding to such electrochemical baths. The immersed surface area of the electrode of interest can also be determined by varying the pulse current amplitude and frequency to obtain a certain predetermined difference between the potential values, measured as described above. The pulse current amplitude and frequency are then used to determine the immersed surface area of the particular electrode according to another mathematical relationship corresponding to such electro-chemical baths.

6 Claims, 5 Drawing Figures

METHOD AND APPARATUS FOR DETERMINING THE IMMERSED SURFACE AREA OF ONE OF THE ELECTRODES OF AN ELECTRO-CHEMICAL BATH

The present invention relates to a method of determination of the immersed surface area of one of the electrodes of an electro-chemical bath, particularly the cathode, and an apparatus for carrying out this method.

When preparing an electro-chemical bath, especially for electroplating, it is necessary for the operator to know the surface area of the members to be treated, in particular the members which constitute one of the electrodes of the bath, i.e. the cathode. The knowledge of this surface area facilitates the adjusting, manually or automatically, of the rectifiers furnishing the current applied to the electrodes. As a matter of fact, the electro-chemical bath must work with a defined density of current, so that the coating is of a high quality. The knowledge of the surface area of the cathode also permits the operator to determine the thickness of the coating when one has measured, for instance by coulometry, the total quantity of the deposited material.

Presently, the surface area of the members to be treated is most generally evaluated by eye or, if the shape of these members permits it, measured on these members themselves. That is difficult and furnishes only a very approximate result.

The purpose of the invention is to determine this surface area by using the electro-chemical installation, connected to an apparatus.

The method according to the invention is characterized by the fact that one measures the potential between the said electrode and the electrolyte, with no current being then applied to the bath. One then applies between the electrodes, immediately after the said measure, a pulse of defined load, and measures immediately thereafter the potential between the electrode, the immersed surface area of which is desired to be determined, and the electrolyte. The difference between the two measured potentials is then used to determine the surface area, taking into account the fact that the ratio between the load of pulse Q, the immersed surface area of the electrode S, and the measured difference of potentials $\Delta U$ responds to the equation $$Q/S = f(\Delta U), f(\Delta U)$$

being practically constant in a large field of application.

The apparatus according to the invention is characterized by the fact that it comprises a generator of pulses applying pulses of current to the electrodes of the electro-chemical installation; means of measuring the potential between the electrode, the immersed surface area of which it is desired to know, and the electrolyte, before and after each pulse; means of memorizing the measured value; means effecting the difference between the memorized potentials; means of control of the generator of pulses as a function of the said difference, which is compared to an assigned value; means of display of the said difference of potential; means of display of the pulse current; the said difference of potential and the said current being indicative of the immersed surface area of the electrode of interest.

The drawings illustrate the principles on which the method is based according to the invention, and also represent, by way of example, one embodiment of the apparatus according to the invention.

Figure 4:
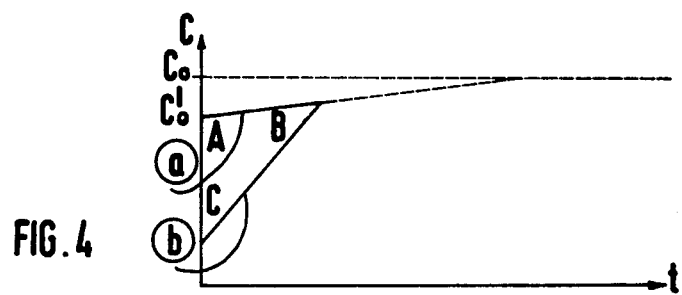

FIG. 4 indicates the ionic concentrations c as a function of the time t before and after each pulse of current.

Figure 5:
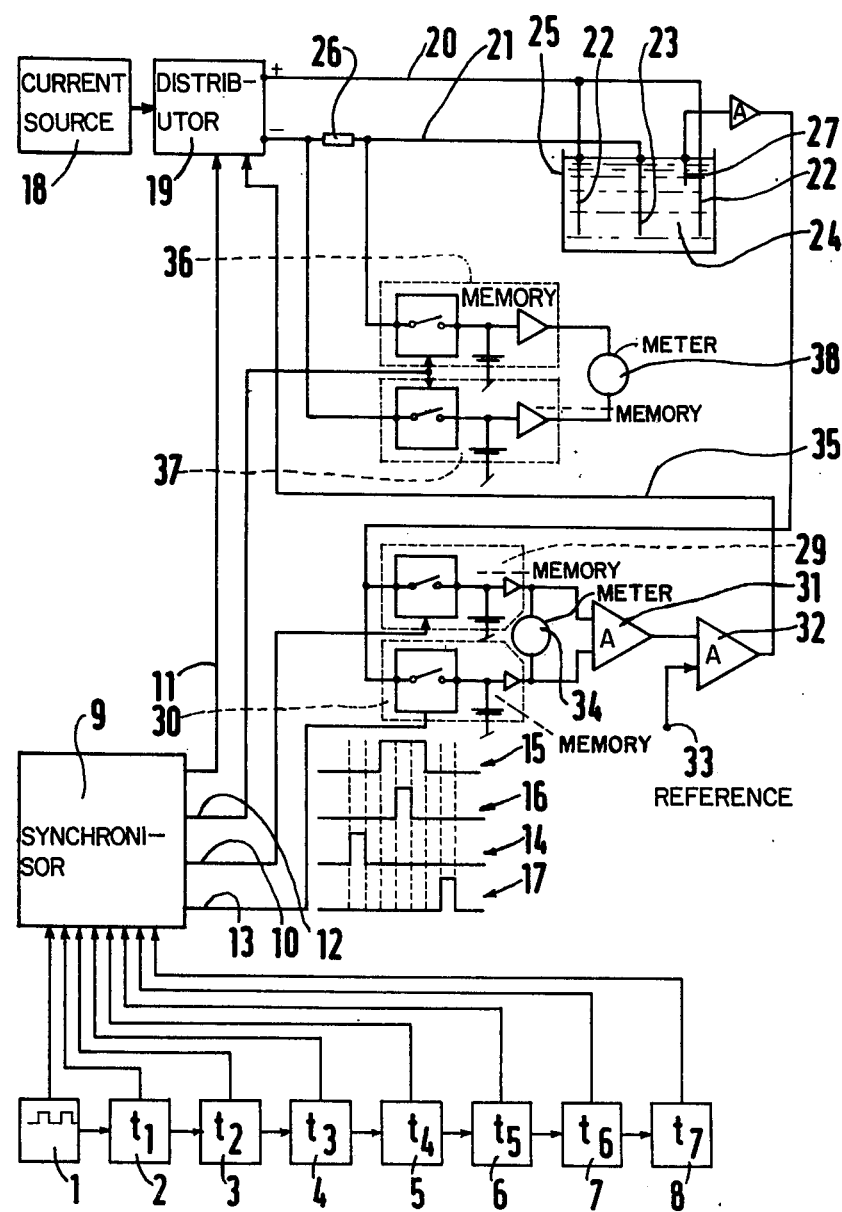

FIG. 5 is a block-diagram representing diagrammatically the electronic circuit of an apparatus allowing the determination of the surface area of the cathode of an electroplating installation.

The invention is based on the following considerations:

It is known that, in an electro-chemical bath at rest, that is to say, a bath in which the electrolyte is not traversed by any current, there is an ionic concentration, which will be called $c_o$. Between the solution of the electrolyte and one or the other of the electrodes, there is a potential called "Static potential" of the electrode. If, by means of an external source of current, one produces a difference of potential between the two electrodes, a current is established through the electrolyte, carried by the migration of the ions contained therein. The passage of this current in the electrolyte has for its effect that the ionic concentration of the electrolyte decreases in the immediate vicinity of the cathode, which is the electrode connected to the negative pole of the source of current. This is due to the fact that ions of the electrolyte disappear while loosing their load at the moment when they come in contact with the surface of the cathode, these ions being replaced from the solution by diffusion and convection, but with some delay.

Figure 1:
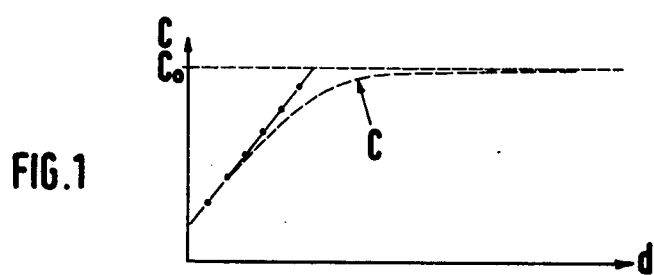
FIG. 1 is a diagram of the ionic concentration c in an electro-chemical bath under current, as a function of the distance d between one of the electrodes and the point where the measurement is made.

If one brings a current to pass in the electrolyte in a continuous operation, the variation of the ionic concentration in the vicinity of the cathode will have the shape represented in FIG. 1. One can show, according to the approximation of Nernst, that the variation of the ionic concentration in the immediate vicinity of the cathode is linear (o—o—o—o—o—).

Figure 2:
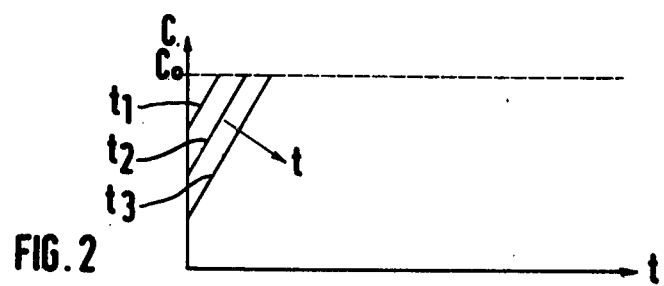
FIG. 2 is a diagram illustrating the ionic concentration c in such a bath subjected to short pulses of current, as a function of the duration t of these pulses.

If, instead of applying to the electrodes a permanent current, one sends, at a time $t_o$, a pulse of short duration, one can show that a drift of ions through the solution does not have sufficient time to occur by convection because of the viscosity of the electrolyte. Thus, in the immediate vicinity of the cathode the sole exchanges are effected by diffusion. FIG. 2 represents curves of ionic concentrations for increasing durations of the pulses $t_1, t_2, t_3 \ldots$, which are linear, as mentioned hereabove, and parallel to each other. Due to the fact that the pulse of current is short, the ionic concentration of the electrolyte does not decrease in the immediate vicinity of the cathode only in a layer the thickness of which is of some $\mu$m, the layer of diffusion. It is known from the theory of diffusion that the slope of the curves of ionic concentration $c = f(x)$ of FIG. 2 are proportional to the density of current at the surface of the cathode.

One has the relation $i = I/S$, provided the distribution of the current at the surface of the cathode is homogeneous, where I is the intensity of the current during the pulse, S is the surface area of the cathode and i is the density of current. One may derive therefrom the relation $$dc/dx = k \cdot (I/S).$$

If one applies to the electrodes a pulse of current of determined duration, at each value of the density of current ($i = I/S$) corresponding to a well defined position of the curve $c = f(x)$ immediately after the pulse, the variation of the ionic concentration produces an electro-motive force (e.m.f.) between the cathode and the electrolyte, called $\epsilon$, the value of which is perfectly defined for a given position of the curve c.

It is to be noted that one can neglect numerous parameters, for instance the parameters relating to the physical and chemical characteristics of the electrochemical bath, either they do not play any role, or they remain constant. Such is the case of the temperature and of the nature of the electrolyte, of the nature of the electrodes, of their surface condition, etc. Thus, the e.m.f. $\epsilon$ is a function of both the load of the pulse and of the surface area of the cathode and is well defined for a density of current, a pulse duration and a cathode surface area, which are also well defined.

If, now, one wishes to obtain at the end of the pulse an e.m.f. of definite value, that is to say $\epsilon_{ref}$ (potential of reference), it is necessary to apply to the system a pulse of current such that, for a given duration of this pulse, the density of current places the curve $c = f(x)$ in such a position that the e.m.f. has precisely the value of reference. If all the other values are maintained constant, the current applied to the electrodes will be a function of the cathodic surface area. In other words, if $$\epsilon = f[c(x)],$$

and if $$c(x) = \phi(i),$$

then
$$\epsilon = f[\phi(i)] = \psi(i).$$

Now, since $$i = I/S, \epsilon = \psi(I/S)$$

Thus, to a defined e.m.f. $\epsilon$ corresponds a density of current which is also defined and if one assigns $\epsilon = \epsilon_{ref}$, one must, for obtaining this result, send a pulse the amplitude of which is proportional to the cathodic surface area.

It is to be noted that the function $\psi$ is not defined more precisely due to the fact that it can be anything, since only one of its points is used, with however the restriction that to a given e.m.f. $\epsilon$, there must correspond a value, and only one, of I/S, and that is truly the case, as is shown by experience.

In still other words, if the system operates in such a way that at the end of the pulse the curve $c = f(x)$ is in a well defined position, the values of $\epsilon$ and of i, and consequently of $\epsilon$ and I/S are bound to each other. For maintaining the e.m.f. at its value of reference, it is the peak current of the pulse which must be adjusted proportionally to the immersed surface area of the cathode. It is to be noted that an adjustment of the duration of the pulse could also be used.

Figure 3:
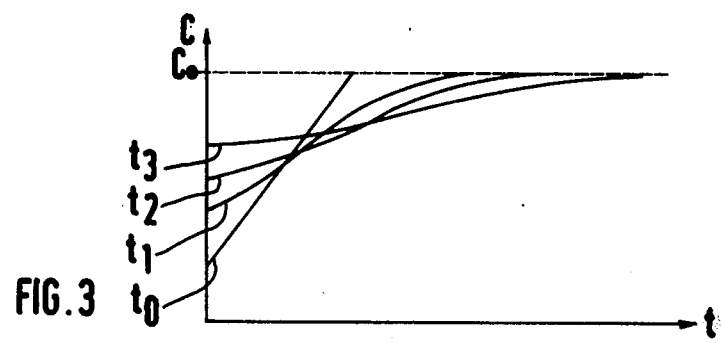
FIG. 3 is a diagram indicating the return of the ionic concentration in the vicinity of an electrode after the end of a pulse of current.

It is to be noted that once the pulse of current has passed, the ionic concentration in the vicinity of the cathode resumes its balance with some delay. For increasing successive times, $t_1, t_2, t_3 \ldots$, $c = f(x)$ thus takes the positions indicated in FIG. 3. A new pulse can be applied to the electrodes as soon as the curve $c = f(x)$ has resumed a slope sufficiently weak.

However, if one does not apply isolated pulses, but a train of pulses, the initial conditions before each pulse do not correspond necessarily to the concentration $c_o$, hereabove mentioned, which is present when one does applies no current and when the system is in a condition of balance. The ionic concentration at each pulse can have a value $c_o'$, with a very light initial slope dc/dx.

When the pulse of current applied to the system is of very short duration or of a limited amplitude the load $Q = I \cdot t_{on}$ keeps a value which is relatively low.

Q = load of the pulse at Cb
I = peak current
$t_{on}$ = duration of the pulse.

This load is too weak for substantially decreasing the ionic concentration of the bath in the vicinity of the cathode. There appears however, in this case, a difference of potential $\Delta U$, between the cathode and the electrolyte, measured immediately after the pulse, which must be attributed to another phenomena than the one hereabove explained by means of the theory of diffusion:

At the surface of an electrode immersed in an electrolyte and placed under current there is formed a capacity called the capacity of double layer, which will be designated by C. The load Q of a condenser, its capacity C and the potential U at its terminals are bound to each other by the well-known relation $Q = C \cdot U$.

In the present case, the pulse of current which is applied to the system will load the capacity of the double layer and cause a $\Delta U$ (difference between the cathode-electrolyte potential, measured immediately before and after the pulse). This $\Delta U$ will be proportional to the load of the pulse and inversely proportional to the capacity of double layer.

$$\Delta U = Q/C$$

For invariable conditions of experimentation, the capacity of the double layer will be proportional to the surface area of the electrode: $C = k \cdot S$, where $k$ = factor of proportionality. It results that $$\Delta U = Q/k \cdot S.$$

The practical result of this theory is exactly the same as this one seen hereabove on the basis of the theory of diffusion, that is to say that, for obtaining a predetermined $\Delta U$, one must apply to the system a pulse the load of which is proportional to the surface area of the considered electrode.

It is also to be noted that the capacity of the double layer is short-circuited by a resistance which varies with the current at the surface of the cathode. Consequently, after the pulse, this capacity will be unloaded, and it is important, so that the results of this measure usable, that the measure of the e.m.f. between cathode and solution after the pulse be made quickly and repetitively.

Because the capacity of the double layer varies as a function of the condition of the surface area of the electrode, it is important that this condition be will defined so that the measurements are repetitive and usable.

In principle, the measurements are effected as follows:

A potential $U_{av}$ is measured between the cathode and a high impedance input sound or probe placed somewhere in the electrolyte, the current of the cathode being zero, that is to say no current passing through the bath. It is to be noted that it is not necessary that the sound or probe be placed close to the cathode since the drop of ohmic tension in the electrolyte is then zero. This potential $U_{av}$ is stored in an analogic memory ("Sample and Hold" circuit). A pulse of current of a defined intensity and of a defined duration is applied to the electrodes. Immediately after the end of this pulse, a potential $U_{ap}$ is measured between the cathode and the sound or probe. The measure must be effected in a very short time, of some micro-seconds, due to the fact that the ionic concentration is very rapidly rebalanced, as it has been said previously.

It is to be noted that this potential $U_{ap}$ must not be confused with the potential which is measured when the system is under permanent current, which takes into account the electrolyte resistance.

The system is then allowed to rest for a time necessary to permit it to return to its initial conditions. Then a new cycle, measure-pulse-measure is switched on. By a differential amplifier, one obtains the difference $\Delta U_{ap-av}$ between the two measured potentials, $U_{ap} - U_{av}$, which is then compared to an assigned value. It is the differences with respect to this assigned value which, after amplification, are used for the control of the distributor.

FIG. 4 illustrates the situation obtained in the case where successive pulses are applied to the electrodes. The hereabove considerations remain, as a matter of fact, valuable, as in the case of trains of pulses, also in the case of the times of rest between the pulses while the physical and chemical characteristics of the system remain constant. Before each pulse the ionic concentration of the electrolyte is defined by the curve a which corresponds to the initial conditions produced by the preceeding pulses, while after each pulse the concentration is defined by the curve b. The electro-motive forces between the cathode and the electrolyte (battery effect) bound to these variations of concentration are respectively $\epsilon_a$ and $\epsilon_b$.

When $\Delta U_{ap-av} = \Delta_{ref}$, the triangle ABC of FIG. 4 is perfectly defined. It is to be noted that, at the moment where this result is reached, the slope of the side b is defined and is proportional to the density of current at the surface of the cathode. Thus, in stable running, the peak current of the pulses is proportional to the cathodic surface.

For a train of pulses of low capacity, the phenomena bound to the capacity of double layer are preponderent with respect to these ones bound to the ionic concentration. In this case, the capacity of double layer is loaded during the pulse, wherefrom exists a difference of potential electrode-solution before and after the pulse. This capacity is unloaded during the interval between two pulses, wherefrom appears a quasi stationary running condition. In this case, the practical result is consequently exactly the same as the one supported by the theory of diffusion.

The triangle ABC will be the same whatever the immersed surface area may be, since it is defined by a density of current, expressed in terms of a unit of surface area.

The apparatus permitting one to carry out the present method is represented in the shape of the diagram in FIG. 5.

This apparatus comprises an oscillator 1 furnishing a basis frequency from which is generated the measurement cycles. It synchronises seven temporizers designated by 2 to 8, placed in cascade, which, by the intermediary of logic gates which are in a synchronisor 9, give the following sequential orders:

Order of reading of the potential "before", by the line 10.

Short period of rest for preventing parasitic effects.

Beginning of the pulse of current on the electrodes by the line 11.

Short period of rest.

Order of reading of the peak current (current of the pulse), by the line 12.

Short period of rest.

End of the pulse of current.

Short period of rest.

Order of reading of the potential "after" by the line 13.

Period of rest sufficiently long so that the system resumes a balance condition.

The shape of the signals sent onto the lines 10, 11, 12 and 13 has been represented at 14, 15, 16 and 17, respectively, at FIG. 5.

An auxiliary feeding or current source, indicated at 18, is connected at a distributor 19 at the outputs 20 and 21 at which appear pulses of current the duration and the position in the time of which are defined by one of the temporizers 2 to 8, and the amplitude controlled by a device which will be disclosed hereafter.

The output 20 of the distributor 19 is connected to the anodes, designated by 22, of the installation of electroplating, while output 21 is connected to the cathode, designated by 23, the anodes and cathode being immersed in a solution of electrolyte 24 contained in a tank 25. A shunt 26 is interposed on one of the circuits, i.e. on the line 21, allowing the current to be measured. A sound or probe 27, constituted by a blade of platinum, for instance, is immersed in the solution. This sound or probe is provided with a pre-amplifier represented separately in FIG. 5, but which, preferably, will be incorporated, since it is important that the current in the sound or probe be very low so that no dynamic polarisation be produced between the sound or probe and the electrolyte. It is moreover necessary that the system be very rapid. These requirements are satisfied by a high input resistance of the amplifier and by a reduction to the minimum of the parasitic capacities.

A memory 29 (Sample and Hold) controlled by the synchronisor 9, line 10, records the potential measured between the cathode 23 and the sound or probe 27 just before each pulse (potential "before").

A memory 30, also controlled by the synchronisor 9, line 13, records the potential measured between the cathode 23 and the sound or probe 27 just after each pulse (potential "after"). A differential amplifier 31 establishes the difference between the potentials "after" and "before," its output potential being compared by an amplifier 32 to a reference potential applied at 33.

The apparatus comprises moreover a millivoltmeter 34 which allows the control of the value of the difference $\Delta U_{ap-av}$ of the two potentials "before" and "after."

The potential at the output of the differential amplifier 31, which has the value of the difference $\Delta U_{ap-av}$ between the potentials "after" and "before," is consequently compared with the reference potential, then the difference is amplified and sent by a line 35 to the distributor 19 where it is used for ensuring the control of the amplitude of the next pulses, these later pulses having to be such that $\Delta U_{ap-av}$ has the exact value of the reference potential.

Lastly, two memory circuits 36 and 37 are connected on the terminals of the shunt 26 which measure the peak current, which is displayed by an amperemeter 38 calibrated so as to furnish directly the value of the cathodic surface area.

It is to be noted that the use of a pulsed running has an added benefit of improving the distribution of current at the surface of the cathode and makes the electrochemical installation less sensitive to a poor distribution of the electric field in the tank.

The period of relaxation has been choosen to be substantially longer than the duration of the pulses. This long period of relaxation is not sufficient to allow the system to resume its rest condition The long period of relaxation has no effect on the final result since $\Delta U_{ap-av}$ does not vary, practically, for values of the relaxation time which are very different.

The average current is defined by the product of the peak current and of the ratio of passage constituted by the duration of the pulse with respect to the duration of a complete cycle. This average current however does not constitute a very significant value, since it varies with the rest time for a similar pulse. Thus, this average current is not necessarily bound to the difference of potentials "after" and "before." Consequently, the notation of pulse load (product of the peak current and of the duration of the pulse) is preferable to the notation of average current since $\Delta U_{ap-av}$ depends therefrom directly, while the rest time remains practically without influence.

Because the measurements have to be very precise and are delicate due to the low potentials involved, it is very important to make them while the high current circuit is stable, because high current circuit transitions can produce interferences which will appear in the whole system.

The state of the surface of the cathode has a great influence on the result of the measure $\Delta U_{ap-av}$. It is therefore important that the grain of this surface and its electro-chemical characteristics be well defined. It will be necessary, especially, to prevent this surface from becoming passive and to prevent a pulverulent deposition to be formed thereon. To this end the selection of the electrolyte can have an important affect on the final result. One can either use a special bath used only to determine the surface area of the cathode, or one can use the treatment bath, in which case the sending of measuring pulses can have the effect of producing a deposition of a thin layer (flash) of the material to be deposited, wherefrom it results that the state of surface of the whole cathode, that is to say of the whole members to be treated, will be of a perfectly homogeneous grain, and that will increase the precision of the information then furnished by the measure.

So that the state of surface of the cathode remains suitable, it may be necessary that a sufficient average current passes through the solution of electrolyte. An adjustment can be effected from the amplitude of the pulses, their duration and their frequency.

The electro-chemical potential of the sound or probe with respect to the electrolyte does not play any role since the measurement of the two potentials, "before" and "after," comprise this same value, which is constant, which consequently is not found in the difference $\Delta U_{ap-av}$.

The e.m.f. due to the variation of concentration at a relatively important distance from the cathode (zone where the exchanges occur due to hydro-dynamism rather than to diffusion) is low with respect to the e.m.f. of concentration in the layer of diffusion, these e.m.f. being bound to the curves of concentration (FIG. 1). During the utilisation of relatively high average currents, one weakens the solution beyond the layer of diffusion. The aleatory character of the hydro-dynamism phenomenon does not seem to be hindered, for the reasons indicated hereabove and due to the fact, also, that the two readings "before" and "after" are so close in time to each other that the hydro-dynamism phenomenon does not have the time to change between them. This is another advantage of the differential measure.

It is to be noted that, if the distribution of the field in the tank is bad, the distribution of the current at the surface of the cathode is also bad and therefore, for this reason, the measurements can be wrong.

The method and the apparatus are not restricted, obviously, to the measurement of the surface area of the cathode but can be applied to measure the surface area of the anode, for the application of electro-polishing.

What I claim is:

1. Method of determination of the immersed surface area of one of the electrodes of an electro-chemical installation including an electrolyte, especially of the cathode, comprising measuring the potential between said electrode and the electrolyte without current being then applied to the bath, applying between the electrodes, immediately after the said measuring, a pulse of defined load; measuring immediately thereafter the potential between the electrode, the immersed surface area of which it is desired to be determined, and the electrolyte; taking the difference between the two measured potentials; and then using the value of this difference for the determination of the surface area it is desired to know, taking into account the fact that the ratio between the load of pulse Q, the immersed surface area of the electrode S, and the measured difference of potentials $\Delta U$ responds to the equation $$Q/S = f(\Delta U), f(\Delta U)$$

being practically constant in a large field of application.

2. Method as claimed in claim 1, further including repeating the operation of sending a pulse of current to the electrodes; and, measuring immediately before and afterwards the potential between the electrode, the immersed surface area of which it is desired to be determined, and the electrolyte, while controlling the load of the successive pulses in such a way that $\Delta U$ be constant and equal to an assigned value.

3. Method as claimed in claim 2, controlling the load of the successive pulses by acting on the amplitude of these pulses.

4. Apparatus for determining the immersed surface area of an electrode in an electro-chemical installation including an electrolyte, comprising:
   means for generating pulses of current and applying them to the electrodes of the electro-chemical installation;
   means for measuring the potential between the electrode, whose immersed surface area is to be determined, and the electrolyte, before and after each pulse;
   means for memorizing the measured potential values;

means for effecting the difference between the memorized potential values;

means for controlling said generating means as a function of the difference between the memorized potential values and as compared to an assigned value;

means for displaying of the difference between the memorized potential values;

means for displaying the pulse current value, said difference between the potential values and said current value both being indicative of the immersed surface area of the electrode whose immersed surface area is to be determined.

5. An apparatus as claimed in claim 4 including a probe immersed in the solution of the electrolyte of the electro-chemical installation and which serves to measure the potential between the electrode, the immersed surface area of which it is desired to be known and the electrolyte, before and after the pulses.

6. An apparatus as claimed in claim 4 including synchronizing means ensuring the desired sequence between, the measuring of the potential values before each pulse, the emission of these pulses, the measure and the display of the peak current during the pulse, and the measuring of the potential values after the pulses; and means for controlling the amplitude of the current pulses so as to maintain at an assigned value the difference between the potential values measured before and after each pulse.

* * * * *